United States Patent [19]

Ruppe

[11] 4,019,275
[45] Apr. 26, 1977

[54] FISHING SINKER
[76] Inventor: George T. Ruppe, P.O. Box 542, Kings Mountain, N.C. 28086
[22] Filed: Mar. 23, 1976
[21] Appl. No.: 669,692
[52] U.S. Cl. .............................................. 43/44.96
[51] Int. Cl.² ...................................... A01K 95/00
[58] Field of Search ................................. 43/44.96
[56] References Cited
UNITED STATES PATENTS

| 1,583,795 | 5/1926 | Pasturzak | 43/44.96 |
| 2,250,038 | 7/1941 | Sink | 43/44.96 |
| 2,841,916 | 7/1958 | Ueda | 43/44.96 |
| 3,167,879 | 2/1965 | Beers | 43/44.96 |

Primary Examiner—Hugh R. Chamblee
Assistant Examiner—Daniel J. Leach
Attorney, Agent, or Firm—Bell, Seltzer, Park & Gibson

[57] ABSTRACT

A fishing sinker with skeletal fins projecting therefrom that serve to engage the floor of the fishing bed and maintain the sinker in its cast position.

7 Claims, 8 Drawing Figures

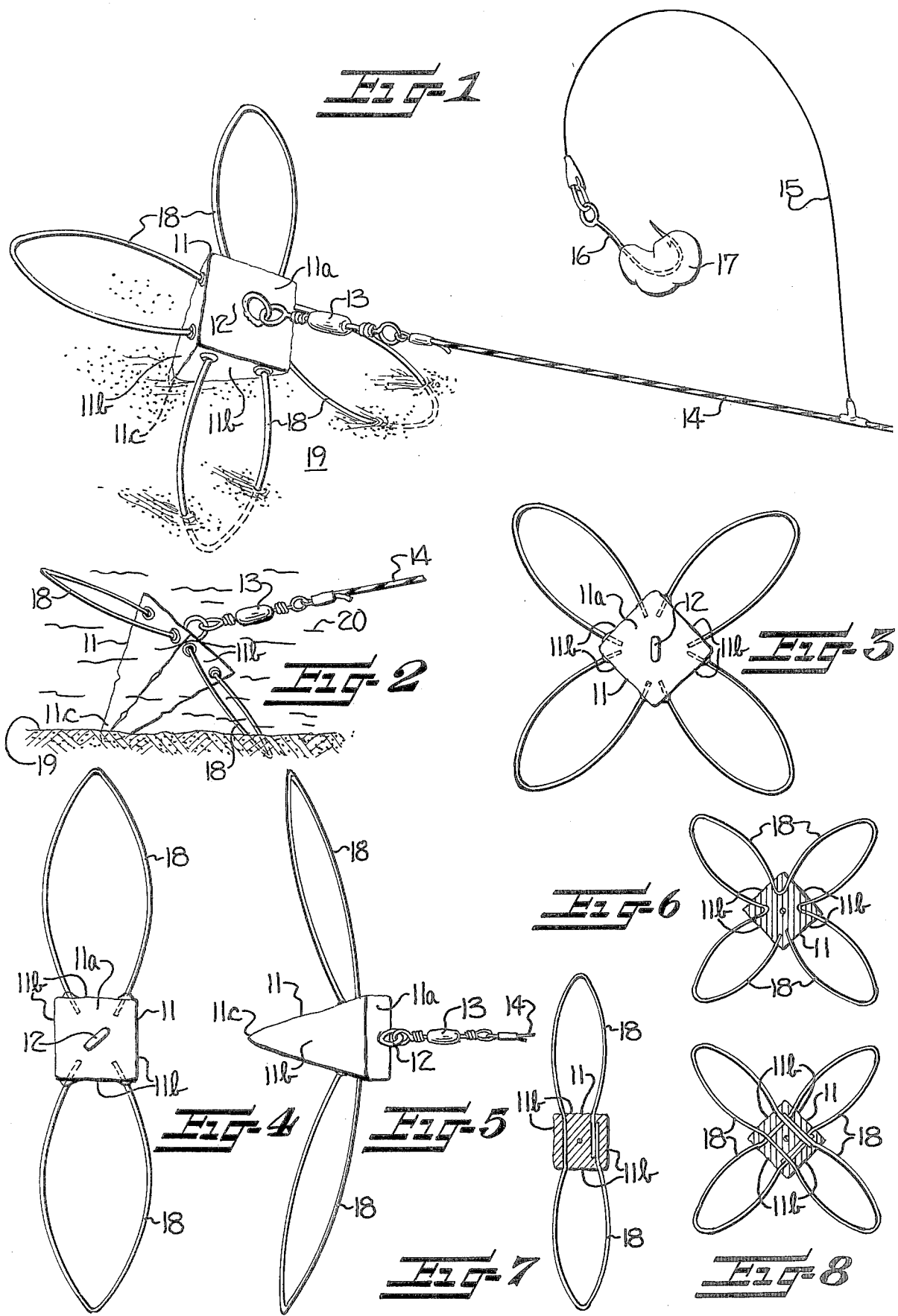

FISHING SINKER

This invention relates to an improved sinker which is particularly suitable for surf and rough water fishing. This improved sinker employs skeletal fins which facilitate maintenance of the sinker in its cast location on the floor of the fishing bed.

Conventional fishing sinkers serve a variety of functions. As projectile weight they aid the angler in attaining greater casting distances so that he can place his bait in desired locations. Upon contacting the water, being denser than water, they sink into the fishing environment and carry with them the accompanying bait until they reach a predetermined depth or, if unfettered by a float, they continue to sink further until coming to rest on the floor of the fishing bed. Finally, upon coming to rest, they act to some degree as anchors partially maintaining the bait in the desired cast location. It is in this final function that conventional sinkers prove to be unsatisfactory in surf fishing or in any type of fishing in which strong water motion in the fishing environment is encountered.

A conventional fishing sinker is usually made of a dense metal, such as lead, and molded into a relatively compact shape such as a pyramid. Whatever anchoring action it has on the floor of the fising bed depends on the frictional forces exerted on it by the floor. Such forces, when using a customary weight sinker of two or three ounces, are typically insufficient to keep the sinker from being tossed about or rolled along the floor by strong water currents and wave action. As a result, the angler's hook, bait and sinker become displaced from the desired location and often become ensnarled in underwater obstructions and forever lost.

Others in the past have proposed providing conventional fishing sinkers with various configurations of straight spikes to engage the floor and thus provide additonal anchoring. Unfortunately, such spiked sinkers have been largely unsuccessful since they provide little useful contact into the water floor.

Indeed alternate forms of such spiked sinkers have been equipped with upwardly directed spikes and employed as grapples wherein the fouling properties of such upwardly directed spikes have been utilized to permanently secure a line to the floor of the fishing bed. Such properties are highly undesirable in the usual fishing sinker which must be easily retrievable upon demand.

Spiked fishing sinkers have other undesired and dangerous propensities. The spikes when in rapid motion as encountered in the usual casting and retrieving actions can impale and damage the catch and can as easily do the same to surrounding human beings.

Another suggested solution has been to construct a sinker of unusual size and shape so that it would have inherent bed-anchoring properties. The result, however, has been a sinker which did not sufficiently meet the generally desired characteristics of a castable sinker or a bed-anchor. Such a sinker when even approaching in size such a size large enough to be effective as a bed-anchor becomes too large, too heavy and too unwieldy to be an effective casting vehicle. Reduction in size to facilitate casting critically reduces such a sinker's bed-anchoring ability.

Accordingly, it is a primary object of the present invention to provide an improved fishing sinker which will act to partially embed itself in the floor of the fishing bed at the point to which it settles after being cast, whereby the accompanying bait and hook will be held in this desired position for attracting and catching greater numbers of fish.

Another object of the invention is the provision of a sinker for fishing lines, which, while acting to partially embed itself in the floor of the fishing bed after being cast, is so designed that when a fish is caught, or if for any other reason the fisherman desires to retrieve the bait, line and sinker, the sinker can be easily dislodged from its temporarily anchored position by a pull on the line and then be readily brought into shore.

Another object of the invention is the provision of a sinker for fishing lines, which may be readily cast through the air to the desired fishing location.

Still another object of the invention is the provision of a sinker for fishing lines, which when retrieved avoids entanglement with kelp, seaweed or other such objects and material commonly encountered when fishing.

Further and more specific objects and advantages of the invention will become apparant as the description proceeds, when taken in connection with the accompanying drawings, in which FIG. 1 is a perspective view showing the invention in its cast position on the floor of the fishing bed, partially embedded in the floor, along with a swivel, line, leader, hook and bait attached;

FIG. 2 is a side view of the invention in its cast position;

FIG. 3 is a top view of the invention illustrating the typical spatial relationship of the fin members;

FIG. 4 is a top view of a particular two-finned embodiment of the invention;

FIG. 5 is a perspective view of the two-finned embodiment of the invention shown in FIG. 4; and FIGS. 6, 7 and 8 are sectional views through the body of the sinker at the bases of the fins illustrating various alternative forms of fin constructions.

Referring more specifically to the drawings, as shown in FIGS. 1, 2 and 3, improved sinker includes a central body 11 of such material or construction so that it is heavier than its equivalent volume of water and thus will sink when submerged in water. As is common, the body 11 may be molded of lead or any other such heavy metal and be some 2 to 6 ounces in weight. As shown in FIGS. 1, 2 and 3, said body is in the shape of a square-based pyramid which has a square as its base 11a and four triangular, lateral faces 11b. Although this form generally corresponds to the typical shape of conventional sinkers, other shapes could be employed such as other polygon-based pyramids, bells, cones or frusto-conical forms, so long as said body has a relatively large base portion and a relatively small tapered end. A tapered shape is aerodynamically preferred since it facilitates the casting of the sinker through the air.

At the center of the base 11a is carried a means 12 for attaching the sinker to desired fishing apparatus. This means may take the form of an eye as shown in FIG. 1 or an integral mounting form may be used. To the eye a conventional fishing swivel 13 may be attached to which a fishing line 14 may be attached in turn. If desired, the fishing line 14 may be directly attached to the eye and the swivel omitted itself. A leader 15, a hook 16 and bait 17 are usually attached further up the fishing line at some predetermined distance from the sinker.

Secured to the body are a plurality of skeletal fins 18 extending outwardly generally radially around the body. Securement may be accomplished by surface soldering to the face 11b or by a combination of soldering and embedding the ends into the face. The planes of the fins are oriented so that the width of the fins extends generally in the same direction as the width of the body. The fins are secured to that portion of the body which is adjacent the base 11a, preferably being no further from the base 11a than one-fourth the length of the face. Placement of the fins closer to the tapered end 11c of the body would normally result in the fins being unfavorably located in relation to the center of gravity of the body, thus producing a less than optimum position of the sinker on the floor of the fishing bed 19.

The skeletal fins may be formed of wire strands made of metal or any other relatively rigid and noncorrosive material. Said fins may be arcuate in outline or loop-shaped as shown in FIGS. 1, 2 and 3, fashioned in a smooth curved form so that the projecting extremities of the fins are relatively semi-circular. Shapes formed of straight lines may also be employed since they provide comparable bed contact. However, such relatively sharp protruding corners may be undesirable if use is contemplated in congested areas.

One novel feature of the fins is that they are skeletal and relatively broad, with their profile being formed of narrow, relatively thin material with a substantive void within the profile. Such skeletal construction allows the complete sinker to be comparatively light in weight, inexpensive and aerodynamic and yet still possess sufficient peripheral fin area to contact the bed 19 and maintain the sinker in the desired location. Further, the skeletal construction allows the bed material such as sand to compress upon and retain the embedded portion of the fin, while still allowing the sinker to be readily retrievable. For there to be sufficient fin area in contact with the bed, the radial extent of the fins must be substantially greater than the widest portion of the body.

In the case of the embodiment shown in FIGS. 1, 2 and 3, a single fin 18 is secured to each lateral face 11b of the pyramid body 11. Also in this embodiment the planes of the fins are substantially perpendicular to the respective lateral faces while also forming acute angles with the longitudinal axis of the body 11. In this and other embodiments, the extremities of the fins are situated generally away from the base portion 11a and generally toward the tapered end 11c, so that the fins assume a trailing position during retrieval. This results in the sinker being less likely to become entangled with kelp, seaweed or the like during retrieval through a fishing environment containing such materials.

Illustrated in FIGS. 4 and 5 is a particular embodiment in which only two fins 18 are employed. A two-finned sinker possesses somewhat unusual characteristics that may or may not be desirable depending on the nature and activity of the surrounding water 20. A two-finned sinker upon contacting the floor of the fishing bed will necessarily lie in a relatively "flat" position with the two fins contacting the floor. As such, unless the fins are particularly wide and long, there will be little if any fin profile embedded in the floor. On the other hand, this relatively flat posture will be especially resistant to lateral rolling and may, in certain circumstances, be the controlling consideration.

The embodiment shown in FIGS. 4 and 5 retains the inherent advantages of the two-fin sinker and employs a construction that minimizes other possible deficiencies. Specifically this embodiment features two particularly broad and long fins secured to opposite lateral surfaces 11b of the body 11 with the width of the fins being greater than the width of the base 11 and the length of the fins being at least twice that of the length of the body.

Referring now to FIG. 6, this embodiment generally corresponds to the embodiment shown in FIGS. 1, 2 and 3 except that instead of the fins being separately formed and secured to the body, they are formed from a single strand of material appropriately bent which is then integrally cast within the sinker body. Similarly, FIG. 7 illustrates an embodiment generally corresponding to the two-finned embodiment shown in FIGS. 4 and 5 except, again, the fins are formed from a single strand of material appropriately bent which is then integrally cast within the sinker body. The embodiment illustrated in FIG. 8 is of a construction employing features of both the embodiment shown in FIGS. 1, 2 and 3, and the embodiment shown in FIG. 7. Namely, the fins are formed from multiple strands of material appropriately bent which are then integrally cast within the sinker body. Each of the embodiments illustrated in FIGS. 6, 7 and 8 have the common characteristic of particularly firm fin securement to the sinker body since in each such embodiment the fin structure is integrally cast within said body. Accordingly, sinkers of such construction are especially adaptable for uses in which a more permanently secured fin construction is desired as for unusually long and repeated fishing activities.

The operation of all embodiments is generally the same. The angler attaches the invention to his fishing line and casts his bait to a desired location. The aerodynamic body of the invention assists this flight and the skeletal fins create no significant impediment. Once the invention contacts the surface of the water it sinks therein until coming to rest on the floor of the fishing bed, presumably in the desired location. Settling on the floor, the weight of the body along with the inertia of the downward sinking motion combine to partially embed the invention in the water bed. This temporary impaction resists the motion of the surrounding water and maintains the sinker and accompanying bait in the desired location. Further, should any rolling motion be initiated in the sinker notwithstanding its impacted nature, the configuration of the fins will act to stop or dampen such motion.

Yet the anchoring quality of the invention is not so great that it will forestall retrieval. When desired, the angler by exerting a normal pull on his line can dislodge the sinker and readily effect a return of his tackle, with or without a fish. Even if this retrieval action is abrupt, this sinker contains no pointed spikes to possibly injure the angler, his catch or spectators. And if fishing in waters infested with foreign materials, a particular embodiment of the invention may be used that will reduce the chance of the invention becoming entangled and lost.

In the drawings and specification there have been set forth preferred embodiments of the invention and, although specific terms ar employed, they are used in a generic and descriptive sense only and not for purposes of limitation, the scope of the invention being defined in the claims.

That which is claimed is:

1. A fishing sinker adapted to withstand the tendency of surrounding flowing water to rapidly displace the same comprising a weighted body having a relatively large base portion and a relatively small tapered end, means carried by the base portion of said body for attaching a fishing line thereto, a plurality of relatively broad skeletal fins secured to said tapered body adjacent the base portion of said body and extending outwardly generally radially around said body, said fins being secured to said body so that the width of the fins extends generally in the same direction as the width of the body, and the radial extent of said fins being substantially greater than the widest portion of said tapered body and thereby being adapted to effectively serve to engage the floor of the fishing bed to facilitate maintenance of the sinker in its cast location, while being readily retrievable.

2. A fishing sinker as described in claim 1 in which said skeletal fins are formed of relatively rigid wire and are arcuate in outline.

3. A fishing sinker as described in claim 1 in which said skeletal fins project downwardly toward said body so that the plane of said fins forms an acute angle with the longitudinal axis of said body with the extremeties of said fins being generally away from the base portion and generally toward the tapered end.

4. A fishing sinker adapted to withstand the tendency of surrounding flowing water to rapidly displace the same comprising a weighted body having a relatively large base portion and a relatively small tapered end, means carried by the base portion of said body for attaching a fishing line thereto, at least one pair of relatively broad skeletal fins secured to opposite lateral surfaces of said body adjacent to the base portion of said body and extending outwardly generally radially around said body, said fins being secured to said body so that the width of the fins extends generally in the same direction as the width of said body and wherein the width of said fins is greater than the width of said body, and the radial extent of said fins being at least twice the length of said body and thereby being adapted to effectively serve to engage the floor of the fishing bed to facilitate maintenance of the sinker in its cast location, while being readily retrievable.

5. A fishing sinker as described in claim 4 in which said skeletal fins are formed of relatively rigid wire and are arcuate in outline.

6. A fishing sinker as described in claim 4 in which said skeletal fins project downwardly toward said body so that the plane of said fins forms an acute angle with the longitudinal axis of said body with the extremeties of said fins being generally away from the base portion and generally toward the tapered end.

7. A fishing sinker adapted to withstand the tendency of surrounding flowing water to rapidly displace the same comprising a weighted pyramidal body, means carried by the base portion of said body for attaching a fishing line thereto, a plurality of relatively rigid wire loops secured to the lateral faces of said body adjacent to the base portion of said body with one loop extending outwardly from each lateral face so that the plane of the loop is substantially perpendicular to the respective lateral face, and the radial extent of said loops being substantially greater than the widest portion of said pyramidal body and thereby being adapted to effectively serve to engage the floor of the fishing bed to facilitate maintenance of the sinker in its cast location, while being readily retrievable.

* * * * *